US012190195B2

(12) United States Patent
Buckris (10) Patent No.: US 12,190,195 B2
(45) Date of Patent: Jan. 7, 2025

(54) SYSTEM AND METHOD FOR ESTABLISHING UNIT POSITIONING AND STATUS VIA ACTUATION DEVICES, UNIT-UNIQUE SCANNABLE CODES EMBEDDED IN UNITS, PROXIMAL ELECTROMAGNETIC CHIPS EMBEDDED IN UNIT STORAGE POSITIONS, AND DEDICATED DATABASES (71) Applicant: Ruben Buckris, Brooklyn, NY (US)

(72) Inventor: Ruben Buckris, Brooklyn, NY (US)

( * ) Notice: Subject to any disclaimer, the term of this patent is extended or adjusted under 35 U.S.C. 154(b) by 0 days.

(21) Appl. No.: 17/974,093

(22) Filed: Oct. 26, 2022

(65) Prior Publication Data

US 2024/0143953 A1 May 2, 2024

(51) Int. Cl.
*G06K 7/08* (2006.01)
*G06F 16/23* (2019.01)
*G06K 7/10* (2006.01)
*G06Q 10/087* (2023.01)

(52) U.S. Cl.
CPC ..... *G06K 7/10366* (2013.01); *G06F 16/2379* (2019.01); *G06Q 10/087* (2013.01)

(58) Field of Classification Search
CPC .. G06Q 10/087; G06Q 10/08; G06Q 10/0833; G06Q 30/0639; G06Q 10/0838; G06Q 10/0875; G06F 16/2379; G06F 2221/2111; G06F 16/9554; G06F 16/283
USPC ........................................ 235/451, 385, 380
See application file for complete search history.

(56) References Cited

U.S. PATENT DOCUMENTS

| | | | |
|---|---|---|---|
| 10,346,852 B2 * | 7/2019 | Ross | G06F 16/5838 |
| 11,282,031 B1 * | 3/2022 | Butler | G06K 7/10128 |
| 2012/0054049 A1 * | 3/2012 | Hayes | G06Q 20/203 |
| | | | 705/302 |
| 2012/0191817 A1 * | 7/2012 | Sayan | G06Q 30/0639 |
| | | | 709/219 |
| 2015/0134552 A1 * | 5/2015 | Engels | G06Q 10/087 |
| | | | 705/318 |
| 2016/0098723 A1 * | 4/2016 | Feeney | G06Q 20/065 |
| | | | 705/75 |
| 2018/0107851 A1 * | 4/2018 | Feldman | G08B 7/06 |
| 2019/0043059 A1 * | 2/2019 | Xie | G06Q 20/40 |
| 2021/0350197 A1 * | 11/2021 | Chow | G06Q 20/3829 |

* cited by examiner

*Primary Examiner* — Daniel St Cyr (57) ABSTRACT

A system for automatically updating a unit code database to reflect activity on the unit-specific level based on parameter capturing and detection mechanisms, with these mechanisms effectuated via scanning unit-unique codes.

14 Claims, 11 Drawing Sheets

SYSTEM AND METHOD FOR ESTABLISHING UNIT POSITIONING AND STATUS VIA ACTUATION DEVICES, UNIT-UNIQUE SCANNABLE CODES EMBEDDED IN UNITS, PROXIMAL ELECTROMAGNETIC CHIPS EMBEDDED IN UNIT STORAGE POSITIONS, AND DEDICATED DATABASES

BACKGROUND

There are currently major supply chain deficiencies. First, while many parties are involved in the process by which materials are assembled into a product and ultimately purchased by a buyer, this process must either be managed by a single party or by a series of a parties. The latter offers flexibility and allows for smaller sized parties to participate in the supply chain but individual transactions are required and these transactions must be handled separately. Secondly, it is currently not feasible for parties who manage units in bulk to individuate the unit prices. This is in part because units of products are not distinguished but treated as interchangeable. However, this prevents the more intelligent pricing and tracking of individual units, the latter of which is required for parties to be paid based on actual units sold rather than based on bulk transactions. Currently, treatment of individual units is a cumbersome process that is handled individually, if at all, and typically only by small-businesses who have limited inventories and are in charge of their own (typically local) manufacturing.

What is needed is an automatic technological solution based on computerized actions triggered by processing of sensor derived data two solve the two problems referenced above. Such a solution will, first, enable the individuation and separate treatment of product units, thereby enabling the individuation of unit prices and simultaneous, and second, to rarify the transactions between parties from a level of bulk engagement to a level of unit engagement.

SUMMARY

Described herein is a system, method, and platform for the creation and tracking of individual units of a multi-unit product, with the system, method, and platform capable of linking each individual unit to each and every party involved in bringing the unit to market.

The system may include a set of devices for creating, maintaining, and receiving updates to a unit database, with this set of devices forming a "central controller". The unit database may identify a product, a code unique to the product, a particular unit of the product, and a code unique to each unit of the product. Thus, each unit may have a product code, which is shared amongst all units of that product, as well as its own unit code, which is unique and designated for it alone. The database (also referred to as a code database) will save information pertaining to a unit in a unit entry dedicated to that unit. As will be discussed, the unit database will associate each unit entry with it its price, purchase history, and reference to each party connected to the unit.

In one embodiment, the unit code is incorporated into a unit such that it cannot be removed. An incorporated unit code will be referred to from hereon as a unit signifier. Incorporation may be achieved via permanently embedding the unit signifier, such as by embossing, debossing, engraving, or printing it in a durable material, such as a hard resin or metal, into the unit itself. The unit signifier may be embedded in an electromagnetic chip such as an RFID, which is in turn embedded within the unit. This prevents separation of the unit from its unit entry in the unit database.

Access to the unit database may be account-password protected to prevent parties who not privy to the chain from inspecting the price, party, and purchase history. In another embodiment, all information pertaining to a unit is publicly available to see on a blockchain.

In the unit database, a single price may be set for all units of a product, or a separate price can be set for each unit. Thus, as an example, there may be ten thousand units manufactured for a given product, and each of those ten thousand units may have the same price, or they may be divided into sets of units, with a separate price for each set but the same price for each unit within a set. If the number of units in each set in one, then each unit may have its price set individually. Price setting may be manual, automatic and based on a set of manually created rules, or automatic and based on a set of automatically created and applied rules. An example of a rule may be that each progressively higher number of a unit has an incrementally higher price—thus the first unit may be set at a dollar, the second at a dollar and ten cents, the third at a dollar and twenty cents, the fourth at a dollar and thirty cents, and so on.

The unit database may identify the physical location of a given unit of the product, such as an address, or any meaningful subdivision or internal location, such as a warehouse lot and bin number.

The signifier may be scanned using a device (an "actuation device") configured or otherwise adapted to scanning graphical signifiers. Database data may then be updated manually by a user of the actuation device, or automatically based on various system parameters of the actuation device. System updates may also occur based on a combination of manual and automatic updates.

The actuation device may comprise a display screen, an input mechanism such as various buttons, a keyboard, or a touch screen, a light source or laser beam, a photodiode, a camera or optical scanner, and an image processor. Ideally, the actuation device is handheld. The actuation device may comprise adaptions to a mobile or smart phone, or a separate dedicated device. Scanning may be graphical, or configured to capture electromagnetic fields/signatures.

System parameters may include the identity of the user of the device, the time at which scanning occurs, the location at which the scanning occurs, or detection of various proximal electromagnetic chips by the device at the moment of scanning or recently thereto. The user identity may be entered manually during a scanning session, prior to the scanning session during a login session, or may have been previously set and saved to the actuation device. The time parameter may be detected based on an internal clock operating via software installed on the actuation device. The location parameter may be detected using a GPS or alternative preferably highly precise location detection component. The electromagnetic chips detected by the actuation device may include RFID or similar components which may be installed, integrated, or embedded in the physical structures in which the products and units are stored, such as in the bin, on the floor or ceiling, on the wall, on a cart or truck, etc. Detection of the proximity of these electromagnetic chips enables a degree of location precision which is otherwise not possible using GPS alone.

In one embodiment, physical shelving incorporate electromagnetic chips arranged horizontally across and vertically up and down shelving units. A virtualized representation of the positioning of the electromagnetic chips vis-à-vis the shelving may be saved in a dedicated database and displayed on the actuation device. If the physical shelving occurs in series, then the series as a whole may also be virtually represented. As information pertaining to the electromagnetic chips are saved in the dedicated database, it would be possible to omit the use of GPS, because the dedicated database may indicate not merely their precise location but also the address at which the shelving is located. The configuration herein described may apply equally to bins, portions of the floor, or other storage solutions.

The electromagnetic chips may be embedded in or otherwise attached to pallets for storing stacks of units. Places in which pallets are expected to be temporarily places or through which they are expected to pass may also possess electromagnetic chips. Thus, if an electromagnetic chip embedded in a pallet is positioned on a portion of a warehouse floor which also possesses an electromagnetic chip, then a scan of a unit code (or an "omni-scan" for proximal electromagnetic chips) would result in the simultaneous detection of the electromagnetic chip embedded in the pallet and an electromagnetic chip embedded in the floor. That simultaneous scan may be processed to indicate that the location not only of any units residing on the pallet, but also the location of the pallet itself. Such information may then be saved to the dedicated database.

Just as the electromagnetic chips may be embedded in shelving, on pallets, or in the floor, so too may they be embedded in portions of vehicles responsible for shipping the units. Thus, a truck, boat, or plane may have electromagnetic chips embedded in its relevant spaces, such as a cargo space.

A user of the device may update the database manually regardless of whether or not they know that their actions constitute or trigger an update of the database. For example, a worker may scan a unit before loading it onto a truck, or a buyer may scan a unit in order to purchase it—in both cases, the user has some particular action in mind, and they may or may not be aware that the unit database has been apprised of that action or some other circumstance or context relating to that unit.

The unit database may receive, for example from users of actuation devices, updates to units, as described above. In addition, units may be identified as having been manufactured, being ready for pick-up, being in transit via truck, boat, or plane, being delivered to a warehouse, being delivered to a retail store, being under a discount, having been purchased, being in transit to a buyer, having a manufacturing defect, being mislabeled, having been damaged during transit, having been damaged by a customer, being outside a return window, being packaged for return, being in transit as a returned item, having been returned to a retail store or warehouse, etc.

The status of a unit may be inferred, by the system, based on the electromagnetic chips read during scanning by the actuation devices. Thus, if an electromagnetic chip is scanned in one portion of a factory, it may indicate that the unit of the proximal unit signifier is being manufactured; if scanned in another portion of a factory, it may indicate that the unit has been manufactured but not yet packaged, etc.

The unit database may identify parties whose goods or services were involved in the design, development, intellectual property, material sourcing, manufacturing, managing, logistics, advertising, wholesale, retail, e-commerce, stocking, shipping, storing, or other activity or responsibility pertaining the product. Each such party may be designated a flat or percentile of the purchase price, the apportionment thereof being recorded in the unit database. The identity of the relevant party may be inferred by the electromagnetic chips detected during the scanning of a unit signifier. Thus, if a proximal electromagnetic chip embedded in a truck owned by a particular trucking company is scanned, the system would determine that the particular trucking company is responsible for shipping the unit.

The unit database may also identify the buyer of the product, as well as the parties responsible for the product if returned. Costs incurred due to defects in the product as manufactured, or damages to the product during storing or shipping, may also be applied to the relevant party. All of these payments and costs are tethered in the unit database to the unit and unit code.

The unit database may be in transactional communication with a cryptocurrency blockchain, with ownership of both the product as well as receipt of various portions of one or more cryptocurrency units being encoded and communicated as instructions to be executed by and recorded in the blockchain. Such instructions may be communicated automatically upon scans associated with various parameters are detected. For example, as soon as a unit of a product is purchased, the detection of which occurs via a scan by a buyer, the price in crypto is subtracted from a crypto wallet owned by the buyer and then transferred to the relevant parties based on the portions owned to them as designated in the unit database. Similarly, if the item is returned, the initial purchase amount in crypto, minus certain costs, may be reassigned to the buyer and subtracted from the wallets of the relevant parties. In addition, penalties may be imposed onto parties responsible for defects, damages, or delays. Such penalties may be transmitted to the administrative wallet of the system, or subtracted from future payments to the same parties.

In one embodiment, payment to relevant parties occurs according to a specified order, with the order previously designated and saved in the unit database. The order may be entered and thereafter captured via a so-called smart contract, which may be accessed and viewed at any time via scanning an applicable unit code or product code. The specified order entails the payment received from the buyer first awarded to the first relevant party in the specified order. For example, if the order is: producer, first logistics, distributor, first warehouse, second logistics, retailer, third logistics, vendor, then the purchase price in crypto is first assigned to the producer, then a portion thereof is re-assigned to the first logistics party, then a portion thereof is re-assigned to the distributor, then to the warehouse, then to the second logistics, then to the retailer, then to the third logistics, and then to the vendor. The exact order will be the result of negotiations of these parties in creating the smart contract. In another embodiment, payment to relevant parties occurs simultaneously and in real time and in accordance to the flat or percentile-based payment designated for each relevant party.

In one embodiment, each party is not necessarily aware of how much of the payment is transmitted to them and how much is transmitted to other relevant parties. Instead, they may only be aware of their portion of the transaction. For example, a manufacturer may be aware that a product has been sold, but only know the initial vendor or distributor involved in the chain, but not the logistics entities or the retailer.

The buyer may cart-scan a plurality of unit codes for the same or for a plurality of products. This scan does not result in a direct purchase, however, but instead to the adding of these cart-scanned units to a virtual cart from which the buyer may choose to keep or subtract units. Alternatively, the buyer may buy-it scan, in which the addition of the units to the virtual cart is skipped and instead purchased immediately upon being buy-it scanned. Payment for the units may occur in real time upon being buy-it scanned, or after approved for purchase in the virtual cart.

In one embodiment, when a buyer scans a unit code, a listing appears on their scanning device to confirm that the unit code pertains to the particular product being purchased. This prevents the purchase of units onto which the wrong unit code has been attached. The listing may show a variety of views of the product as well as a description as to what the product is, its condition, and its various features. The listing may also designate the identity of the recipients of the product, including their contact information, addresses, etc., thereby enabling a user to contact the recipients if the product is defective.

A prospective buyer may perform a status scan of the unit code to determine if the product has any recalls associated with it, or whether or not it has been listed as stolen by a government agency or other relevant party. To prevent the same product from being purchased several times before being shipped to the buyer, a purchase scan may display on any subsequent buyer's scanning device that the unit has already been sold, thereby informing them that they will need to find a different unit.

DETAILED DESCRIPTION OF THE DRAWINGS

Figure 1:
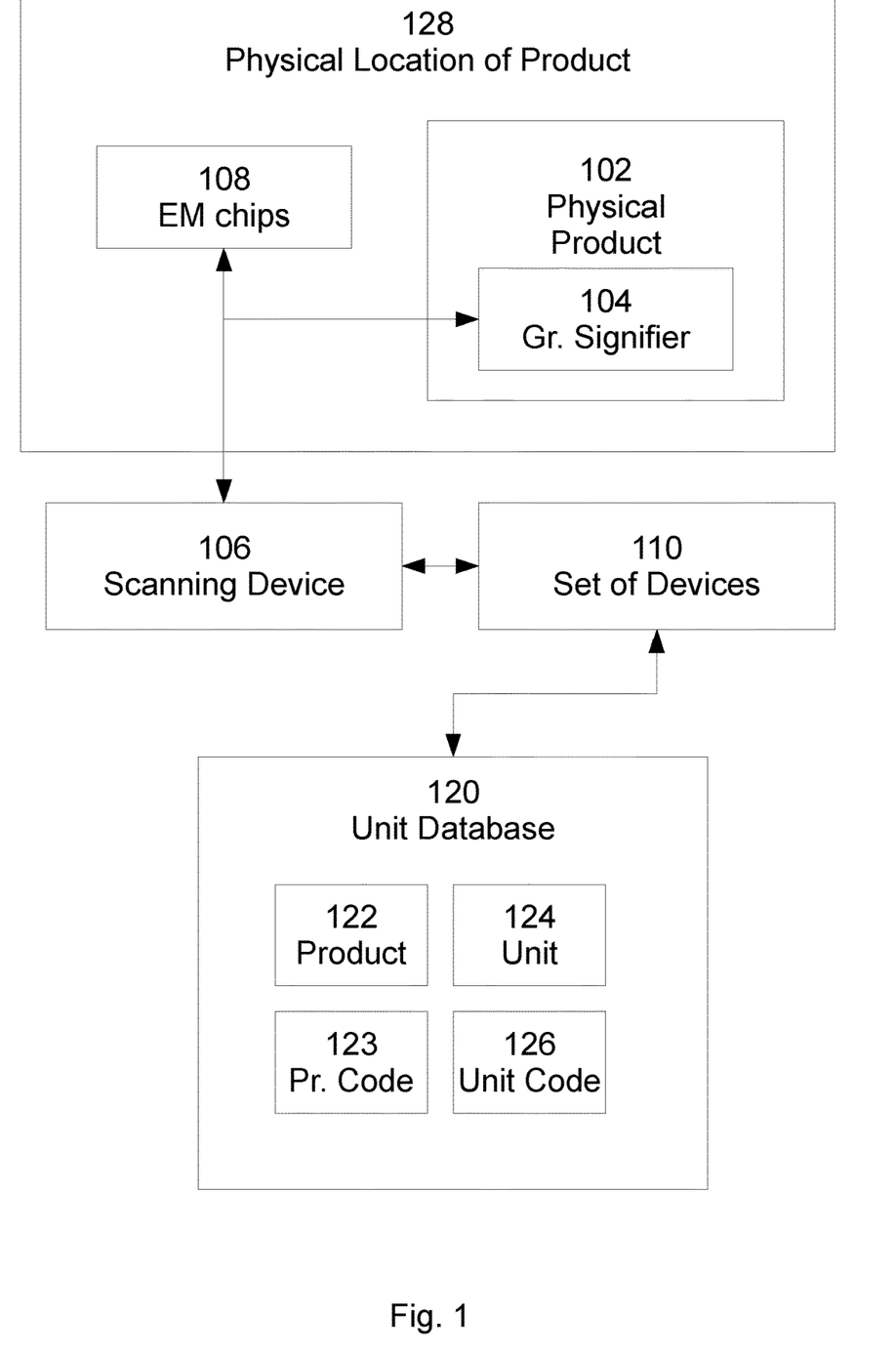
FIG. 1 shows a diagram of an exemplary system.

As shown in FIG. 1, the system may comprise a set of devices 110 for creating, maintaining, and receiving updates to a unit database 120. The unit database may identify a product 122, product codes 123, a code unique to the product 124, a particular unit of the product 124, and a code 126 unique to each unit of the product. Thus, each unit may have a product code, which is shared amongst all units of that product, as well as its own unit code, which is unique and designated for it alone. The devices may be configured to scan the unit codes of actual physical products in order to access, update, and view the various parameters of given units.

To facilitate updates to the unit database, the unit code may be represented by a graphical signifier 104 thereof, and this graphical signifier may be affixed to the physical unit 102. The graphical signifier may in turn be scanned using a scanning device 106 configured or otherwise adapted to scanning graphical signifiers.

The unit database may identify the physical location 128 of a given unit, such as an address or any meaningful subdivision or internal location, such as a warehouse lot and bin number. The scanning device may be configured to detect the proximity of various electromagnetic chips 108 which may indicate the warehouse lot and bin number.

Figure 2:
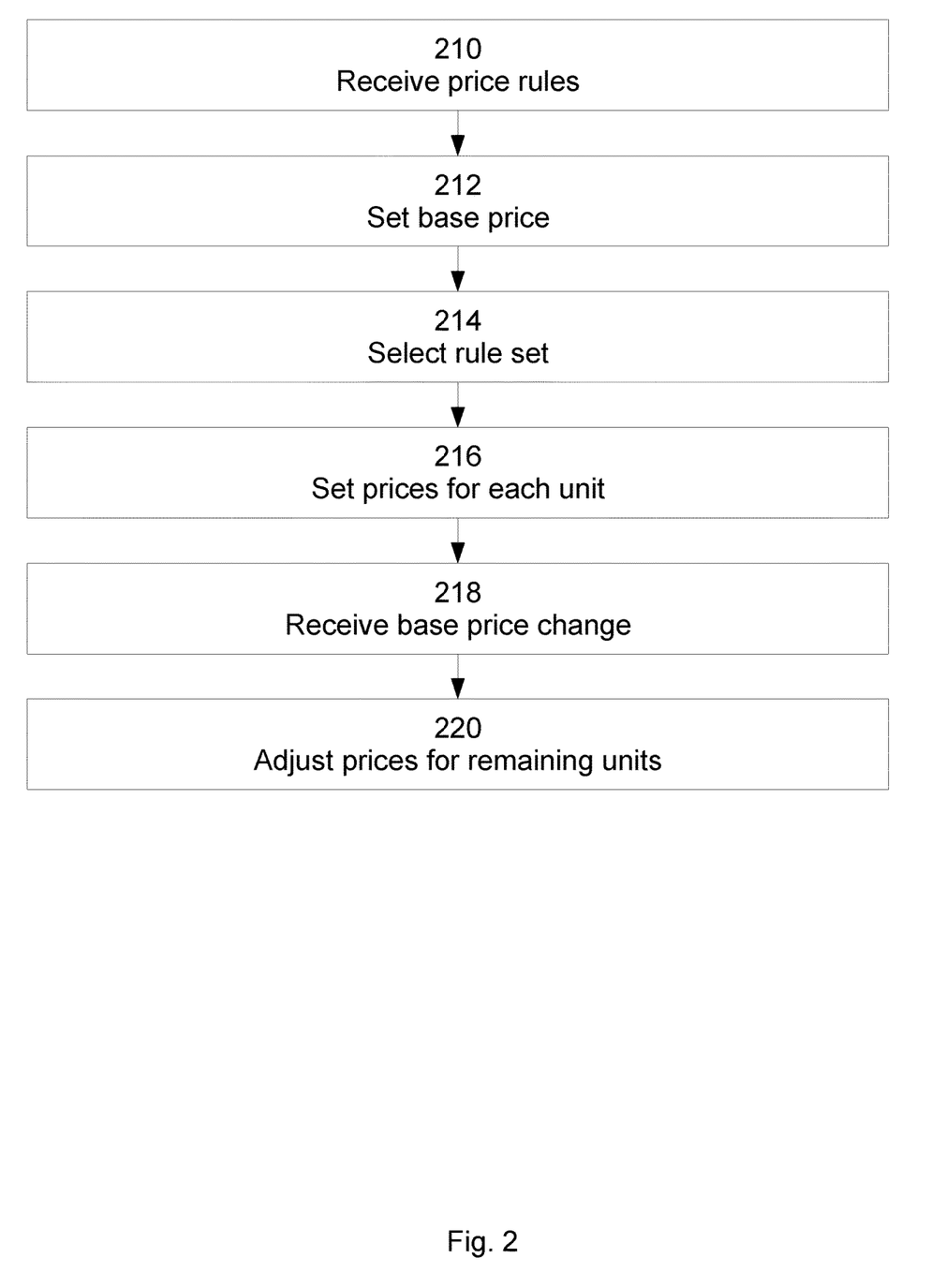
FIG. 2 shows a flowchart of an exemplary process of individuating units.

As shown in FIG. 2, in the unit database, a basic price may be set for the product, but a separate price can also be set for each unit of the product. Thus, as an example, there may be ten thousand units manufactured for a given product, and each of those ten thousand units may have the same price, or they may be divided into sets of units with each unit within a set having the same price, or each unit may have its price set individually. Price setting may be manual, automatic, based on a set of manually created rules, or based on automatic rules. Thus, sets of rules may be set for a given product 210, with the sets being offered by the system or created by users. A first or base price for a product may be set 212, a set of price rules may be selected 214, and then based on the rules, prices may be set for each unit of the product 216. An example of a rule may be that each progressively higher number of a unit has an incrementally higher price—thus the first unit may be set at a dollar, the second at a dollar and ten cents, the third at a dollar and twenty cents, the fourth at a dollar and thirty cents, and so on. If the base price is changed 218, the unit pricing may be accordingly adjusted by the system for all remaining units 220.

Figure 3:
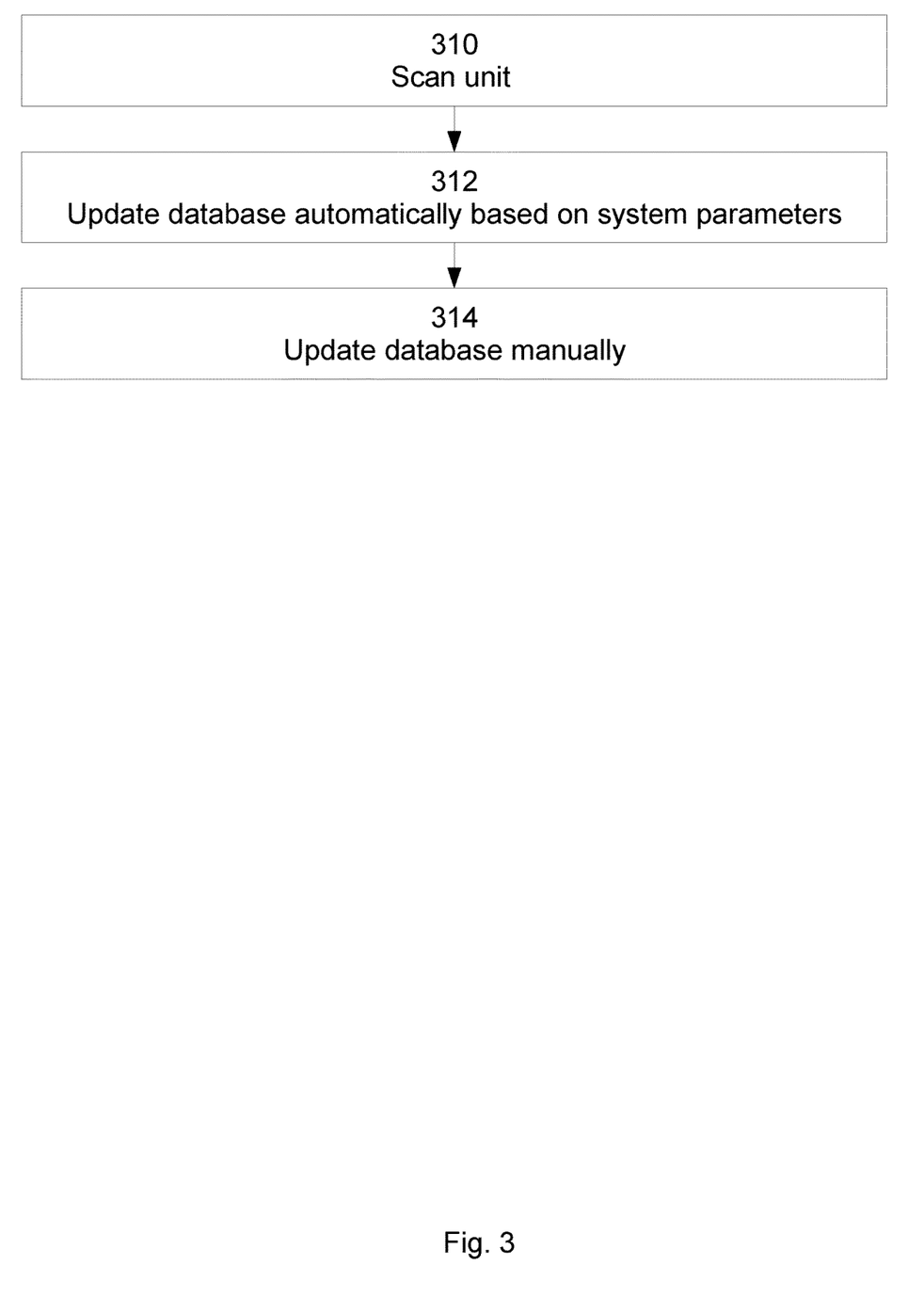
FIG. 3 shows a flowchart of an exemplary process of updating the unit databased based on system parameters of the actuation device.

As shown in FIG. 3, upon a unit being scanned by a scanning device 310, the database data may then be updated automatically 312 based on various system parameters, and/or manually 314 by a user of the scanning device. System updates may also occur based on a combination of manual and automatic updates.

Figure 4:
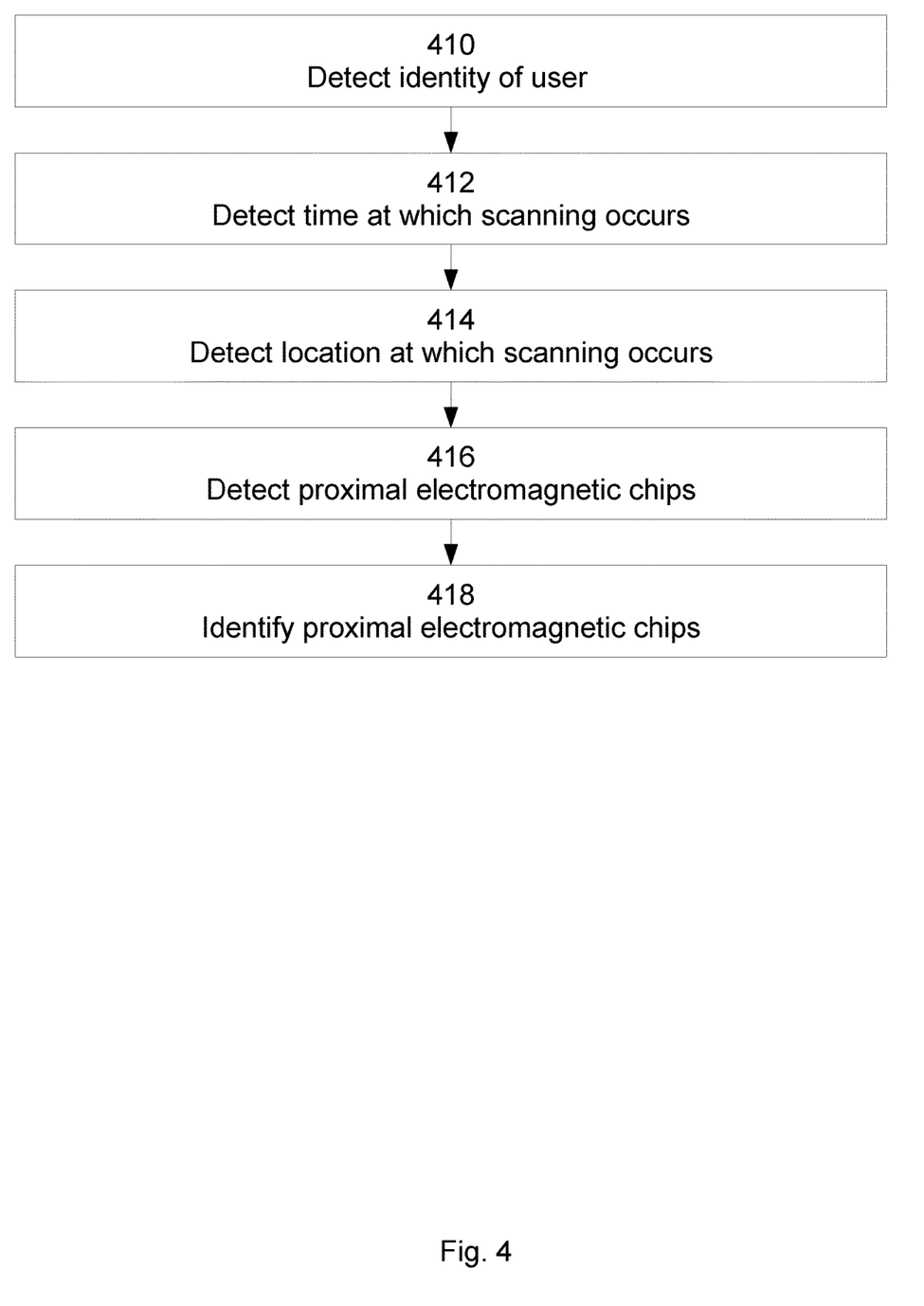
FIG. 4 shows a flowchart of an exemplary process of updating the unit databased based on system parameters of the actuation device, including the proximity and identity of electromagnetic chips.
Figure 5:
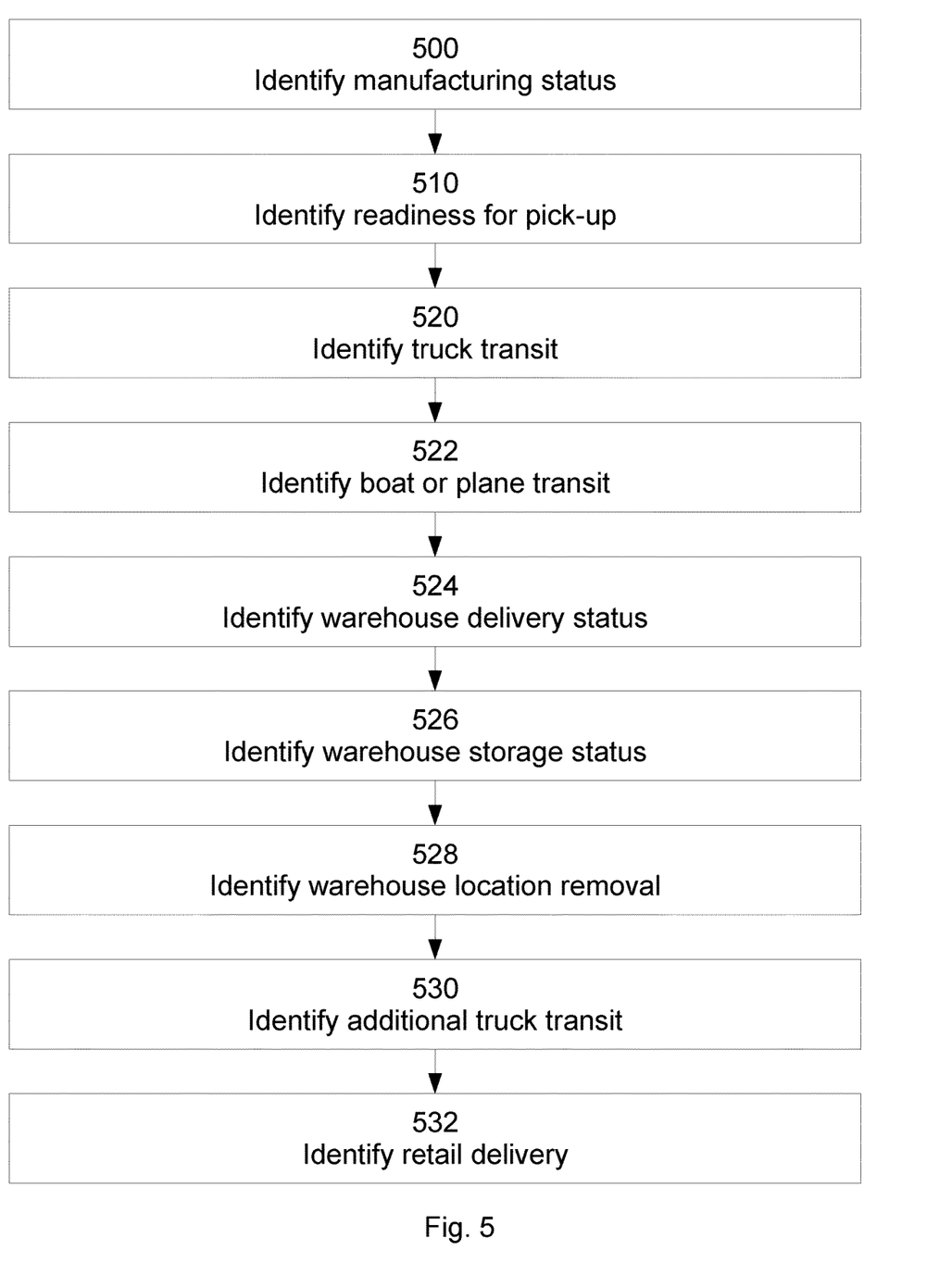
FIG. 5 shows a flowchart of an exemplary process of identifying unit status based on the scanning of electromagnetic chips.
Figure 6:
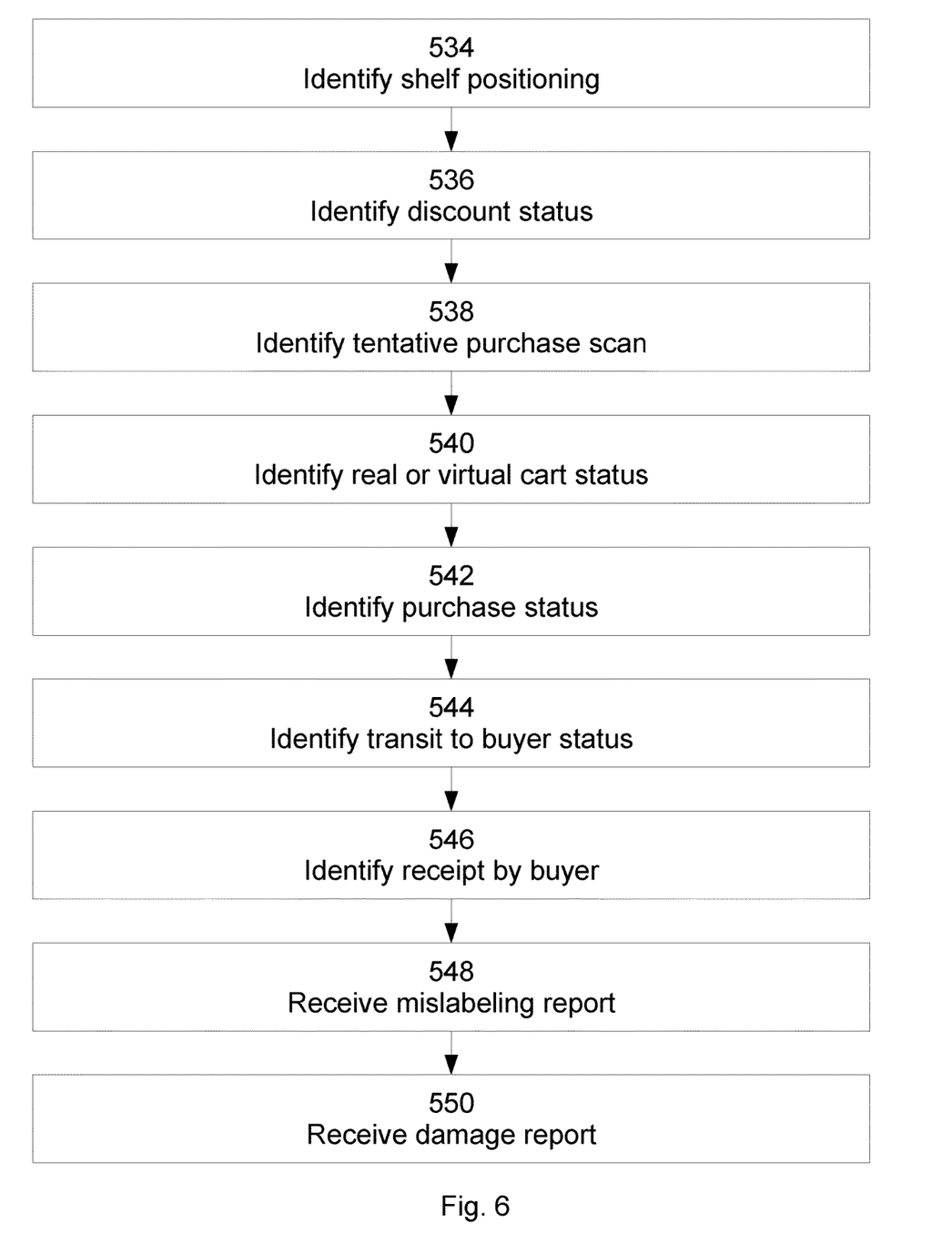
FIG. 6 shows a flowchart of an exemplary process of identifying unit status based on the scanning of electromagnetic chips.
Figure 7:
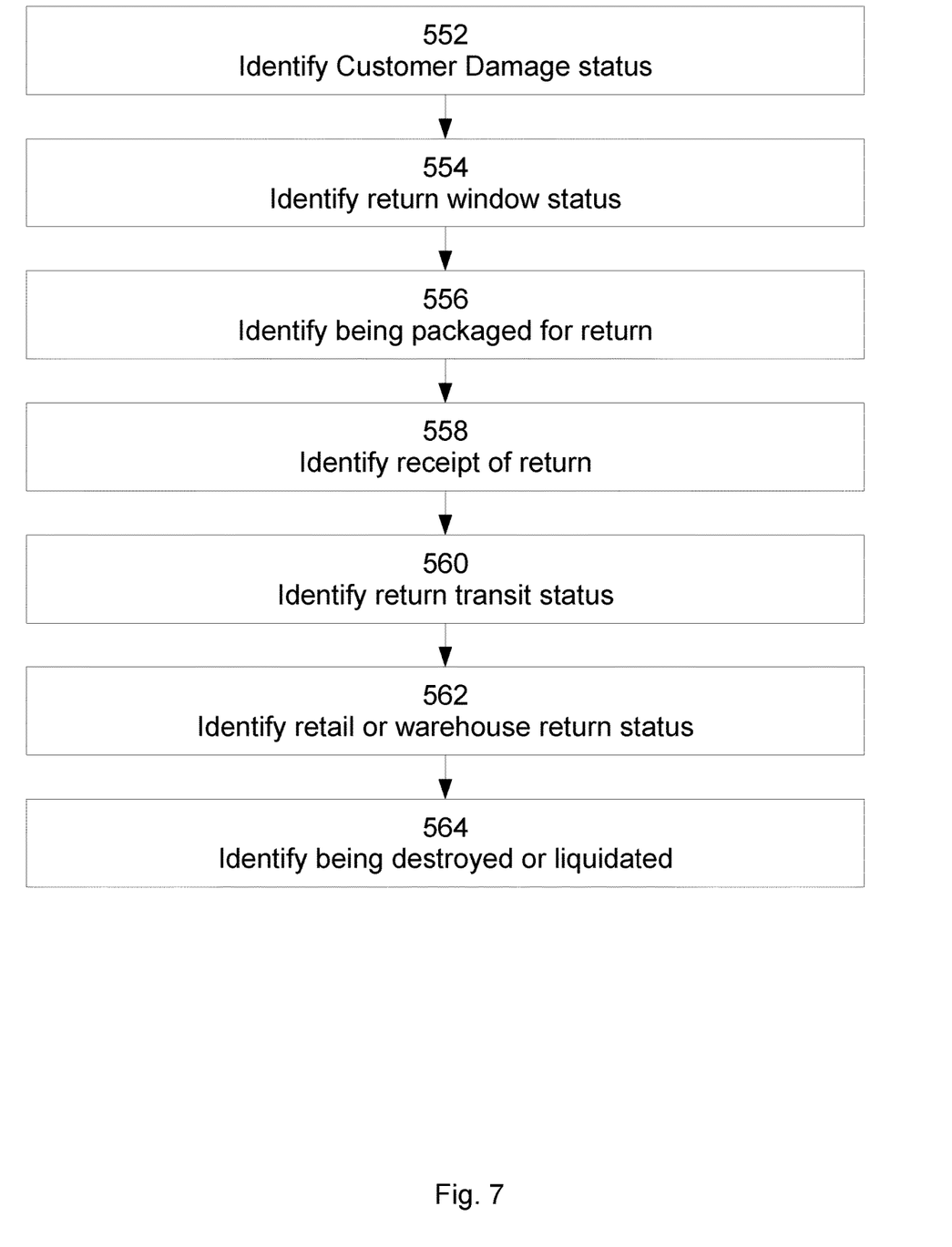
FIG. 7 shows a flowchart of an exemplary process of identifying unit status based on the scanning of electromagnetic chips.

As shown in FIG. 4, system parameters may include the identity of the user of the device 410, the time at which scanning occurs 412, the location at which the scanning occurs 414, or detection of various proximal electromagnetic chips 416 by the device at the moment of scanning or recently thereto and the identification thereof 418. The user identity may be entered manually during a scanning session, prior to the scanning session during a login session, or may have been previously set to the device. The time parameter may be detected based on an internal clock operating via software installed on the device. The location parameter may be detected using a GPS or alternative preferably highly precise location detection component. The electromagnetic chips detected by the device may include RFID or similar components which may be installed, integrated, or embedded in the physical structures in which the products and units are stored, such as in the bin, on the floor or ceiling, on the wall, on a cart or truck, etc. Detection of the proximity of these electromagnetic chips enables a degree of location precision which is otherwise not possible using GPS alone.

A user of the device may effectively update the database regardless of whether or not they know that their actions constitute or trigger an update of the database. For example, a worker may scan a unit before loading it onto a truck, or a buyer may scan a unit in order to purchase it—in both cases, the user has some particular action in mind, and they may or may not be aware that the unit database has been apprised of that action or some other circumstance or context relating to that unit.

The unit database may receive, for example from users of scanning devices, updates to units, as described above. In addition, as shown in FIGS. 5-8, units may be identified as having been manufactured 500, being ready for pick-up 510, being in transit via truck 520, boat and/or plane 522, being delivered to a warehouse 524, being stored in a warehouse 526, being removed from a warehouse location 528, being placed on another truck 530, being delivered to a retail store 532, being positioned on a shelf 534, being under a discount 536, having been scanned by a customer for tentative purchase 538, having been added to a real or virtual cart 540, being purchased and paid for 542, being in transit to a buyer 544, being received by the buyer 546, reported to have a manufacturing defect 546, reported to have been mislabeled 548, reported to have been damaged during transit 550, identified as having been damaged by a customer 552, being outside a return window 554, being packaged for return 556, having been received for return delivery 558, being in transit as a returned item 560, having been returned to a retail store or warehouse 562, having been destroyed or otherwise liquidated 564, etc.

The unit database may also identify parties whose goods or services were involved in the design, development, intellectual property, material sourcing, manufacturing, managing, logistics, advertising, wholesale, retail, e-commerce, stocking, shipping, storing, or other activity or responsibility pertaining the product. Each such party may be designated a flat or percentile of the purchase price, the apportionment thereof being recorded in the unit database. The unit database may also identify the buyer of the product, as well as the parties responsible for the product if returned. Costs incurred due to defects in the product as manufactured, or damages to the product during storing or shipping, may also be applied to the relevant party. All of these payments and costs are tethered in the unit database to the unit and unit code.

Figure 8:
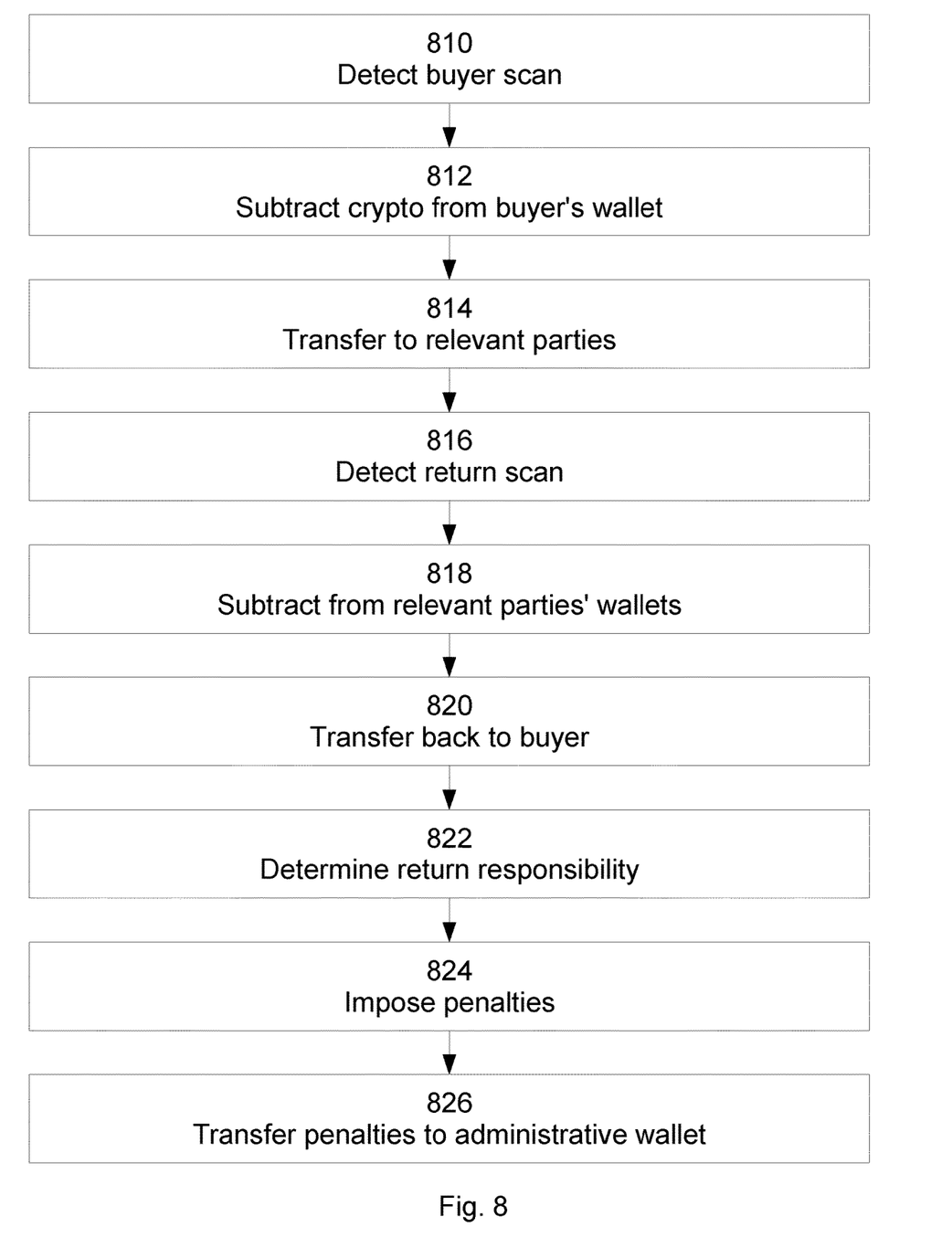
FIG. 8 shows a flowchart of an exemplary process of determining defect fault and imposing penalties based on the detection of electromagnetic chips.

The unit database may be in transactional communication with a cryptocurrency blockchain, with ownership of both the product as well as receipt of various portions of one or more cryptocurrency units being encoded and communicated as instructions to be executed by and recorded in the blockchain, as shown in FIG. 8. Such instructions may be communicated automatically upon scans associated with various parameters are detected. For example, as soon as a unit of a product is purchased, the detection of which occurs via a scan by a buyer 810, the price in crypto is subtracted from a crypto wallet owned by the buyer 812 and then transferred to the relevant parties 814 based on the portions owned to them as designated in the unit database. Similarly, if the item is returned, as detected by a return scan 816, the initial purchase amount in crypto, minus certain costs, may be subtracted from the wallets of the relevant parties 818 reassigned to the buyer 820 and. Responsibility for the return, based on an error or omission, is determined 822, penalties may be imposed onto parties responsible for defects, damages, or delays 824. Such penalties may be transmitted to the administrative wallet of the system 826, or subtracted from future payments to the same parties.

Figure 9:
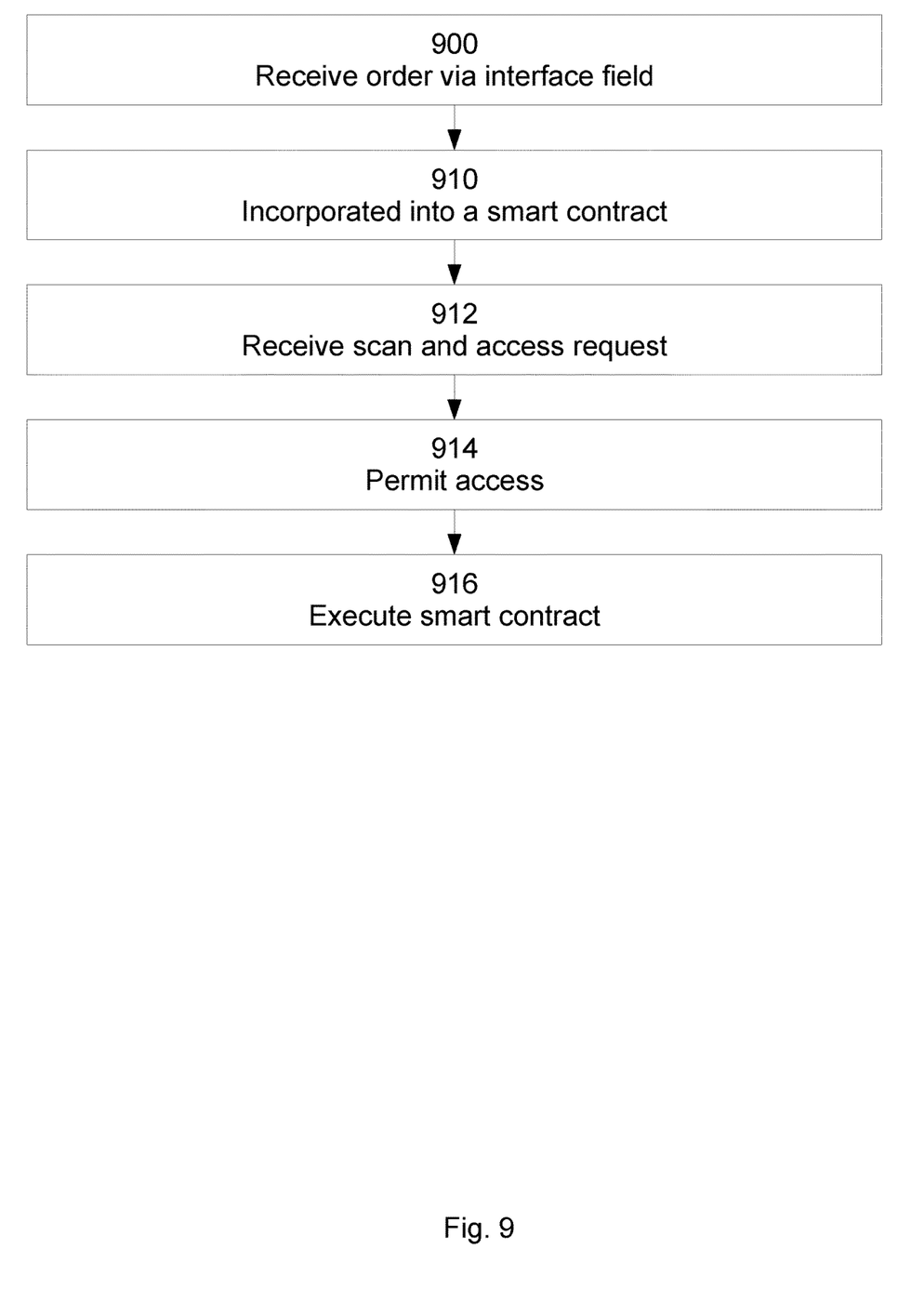
FIG. 9 shows a flowchart of an exemplary process of establishing responsibility for a unit via smart contracting and the execution of a smart contract via a blockchain.

In one embodiment, as shown in FIG. 9, payment to relevant parties occurs according to a specified order, with the order previously designated and saved in the unit database. The order may be entered into a interface field or an upload of a template or other document 900 and thereafter captured and incorporated into a so-called smart contract 910, which may be accessed and viewed 914 at any time via scanning and access request 912 of an applicable unit code or product code. The specified order entails the payment received from the buyer first awarded to the first relevant party in the specified order. For example, if the order is: producer, first logistics, distributor, first warehouse, second logistics, retailer, third logistics, vendor, then the purchase price in crypto is first assigned to the producer, then a portion thereof is re-assigned to the first logistics party, then a portion thereof is re-assigned to the distributor, then to the warehouse, then to the second logistics, then to the retailer, then to the third logistics, and then to the vendor. The exact order will be the result of negotiations of these parties in creating the smart contract. In another embodiment, payment to relevant parties occurs simultaneously and in real time and in accordance to the flat or percentile-based payment designated for each relevant party. The system may be configured to execute order payment instructions by engaging in an API type connection with a platform configured to engage with the smart contract 916

In one embodiment, each party is not necessarily aware of how much of the payment is transmitted to them and how much is transmitted to other relevant parties. Instead, they may only be aware of their portion of the transaction. For example, a manufacturer may be aware that a product has been sold, but only know the initial vendor or distributor involved in the chain, but not the logistics entities or the retailer.

The buyer may cart-scan a plurality of unit codes for the same or for a plurality of products. This scan does not result in a direct purchase, however, but instead to the adding of these cart-scanned units to a virtual cart from which the buyer may choose to keep or subtract units. Alternatively, the buyer may buy-it scan, in which the addition of the units to the virtual cart is skipped and instead purchased immediately upon being buy-it scanned. Payment for the units may occur in real time upon being buy-it scanned, or after approved for purchase in the virtual cart.

In one embodiment, when a buyer scans a unit code, a listing appears on their scanning device to confirm that the unit code pertains to the particular product being purchased. This prevents the purchase of units onto which the wrong unit code has been attached. The listing may show a variety of views of the product as well as a description as to what the product is, its condition, and its various features. The listing may also designate the identity of the recipients of the product, including their contact information, addresses, etc., thereby enabling a user to contact the recipients if the product is defective.

In one embodiment, the listing may indicate the price of the instant unit, and also the price of subsequent units, so that the buyer is aware of any inevitable price increases if the buyer does not use the opportunity to buy the instant unit price before it is purchased by another buyer.

Figure 10:
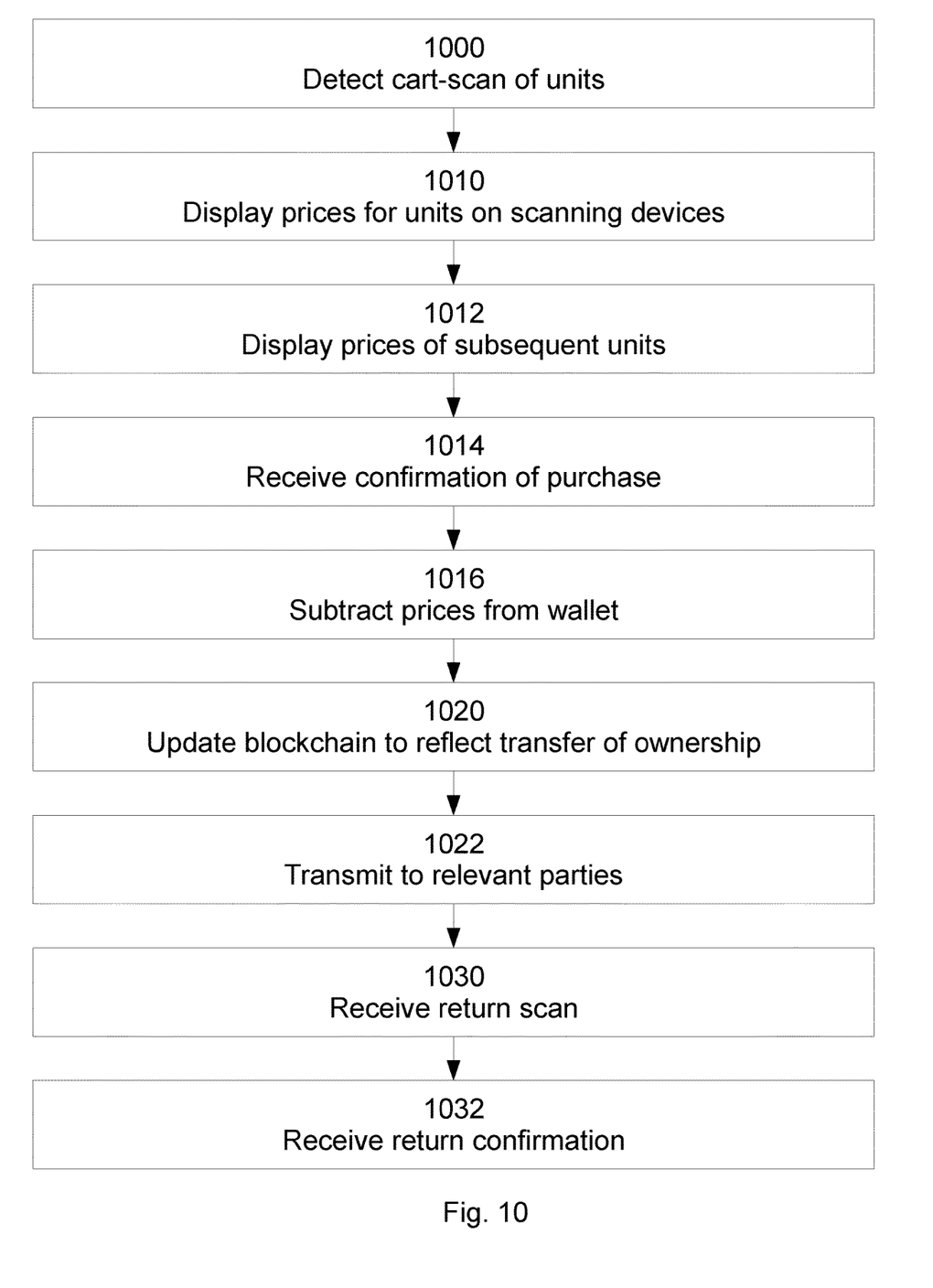
FIG. 10 shows a flowchart of an exemplary process of establishing responsibility for a unit via smart contracting and the execution of a smart contract via a blockchain.
Figure 11:
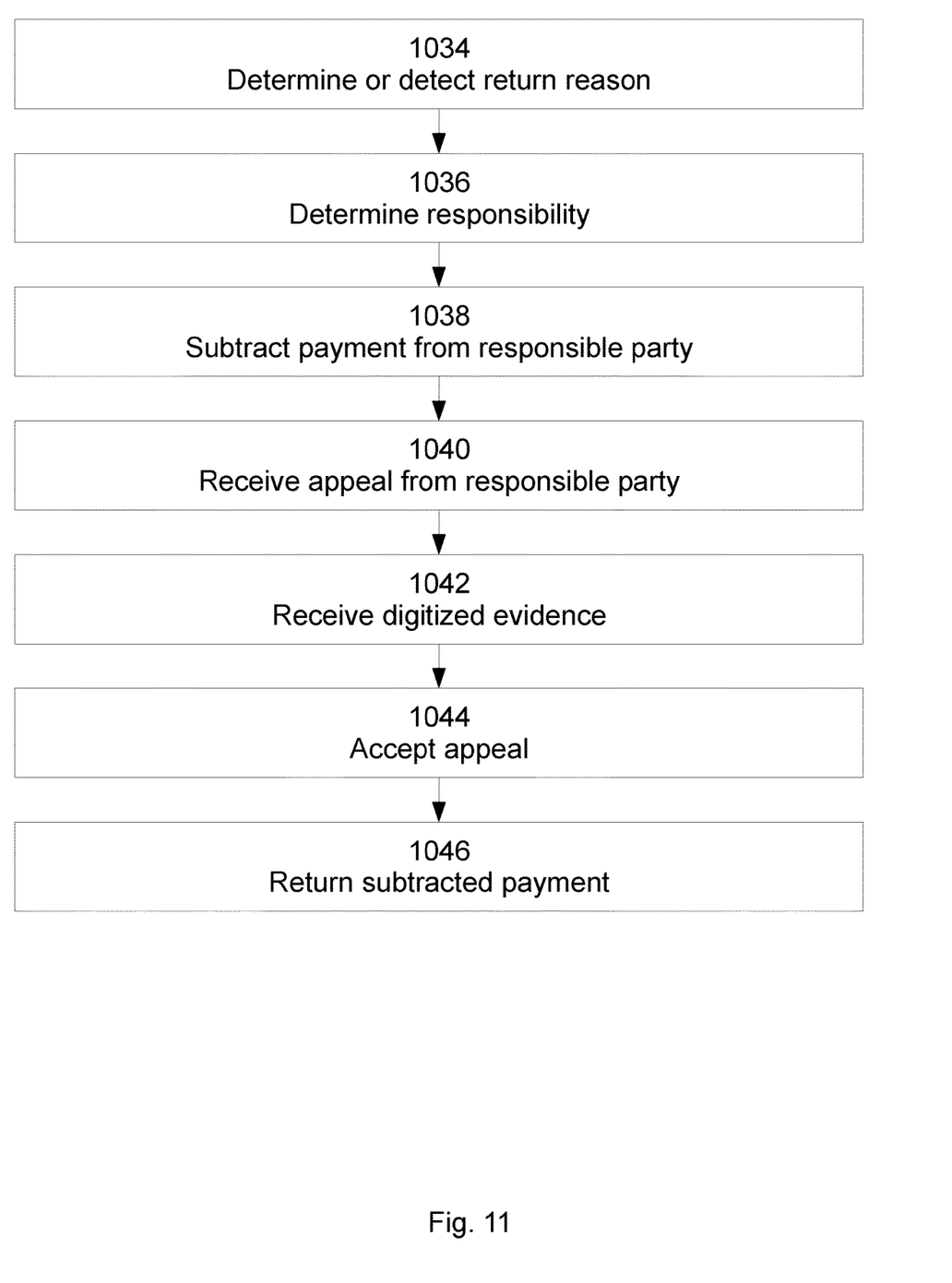
FIG. 11 shows a flowchart of an exemplary process of determining defect fault and imposing penalties based on the detection of electromagnetic chips.

As shown in FIGS. 10-11, a user may cart-scan a group of units 1000, listings for each of the units with their prices may be displayed on the scanning device 1010, and prices for subsequent units (i.e., those which will be available after a current set of units are purchased) may also be displayed 1012. The user may confirm purchase of the units 1014, and the prices may be subtracted from the user's virtual (crypto)

wallet 1016. A blockchain may be updated to reflect the transfer of ownership of the unit 1020. The (crypto) payment may be transmitted to relevant parties 1022 based on a previously designated order. If the user scans the units again or performs a return scan 1030, the user may indicate a desire to return the units 1032, and identify the reason for the return 1034. The system will determine, based on the reason for the return, which relevant party is responsible 1036, and then a portion or all of the payment made to the relevant party will be subtracted from that party or what that party is owed on future transactions 1038. The system may receive an appeal from the relevant party 1040, together with a transmission of digitized evidence 1042, and if the appeal is accepted (i.e., granted) 1044, return the subtracted payment 1046.

A prospective buyer may perform a status scan of the unit code to determine if the product has any recalls associated with it, or whether or not it has been listed as stolen by a government agency or other relevant party. To prevent the same product from being purchased several times before being shipped to the buyer, a purchase scan may display on any subsequent buyer's scanning device that the unit has already been sold, thereby informing them that they will need to find a different unit.

In one embodiment, the unit code is incorporated into a product such that it cannot be removed, such as by permanently embedding a unit code formed of a durable material, such as a hard resin or metal, into the product itself. In another embodiment, the unit code is embedded in an electromagnetic chip such as an RFID, which is in turn embedded within the product. This prevents separation of the unit from its purchase history, thereby preventing theft and preserving the purchase history. Access to the unit database is account-password protected to prevent parties who not privy to the chain from inspecting the price, party, and purchase history. In another embodiment, all information pertaining to a unit is publicly available to see on the blockchain, so if an individual has access to a part of the history pertaining to a unit, the remainder can be discovered.

The invention claimed is:

1. A system comprising a code database, a set of actuation devices, and a central controller;
   a. with the code database configured to receive and save updates on products and units;
   b. with each product assigned a product code and associated with a plurality of units;
   c. with each unit of the plurality of units associated with a given product, assigned a unique unit code, and having a unique price and a physical location identifier;
   d. with each unit having the unique unit code attached physically to the each unit;
   e. with each actuation device configured to perform a unit code scan;
   f. with each actuation device configured to associate any given unit code scan of a given unit with:
      i. a time at which the given unit scan occurred,
      ii. physical location parameters, with the physical location parameters identifying a physical location in which the scan occurred or at which the given unit is located at approximately the time at which the given unit scan occurred;
   g. with the central controller comprising a set of processors programmed to:
      i. upon detecting a scan of a given unit code for a given unit by a given actuation device, update in the code database the physical location identifier of the given unit code database based on the physical location parameters
   h. with the physical location parameters including a physical address parameter and an internal location parameter,
   i. with the actuation device determining the internal location parameter by detecting the distance and/or proximity of electromagnetic signatures of electromagnetic chips positioned adjacent to the given unit.

2. The system of claim 1, with pricing for the plurality of units comprising incremental increases in pricing for a given series of units.

3. The system of claim 1, with the actuation device determining the physical address parameter using GPS.

4. The system of claim 1, with the electromagnetic chips attached to transportation vehicles onto which the given unit is loaded or with which the given unit is carried.

5. The system of claim 1, with the actuation devices configured to communicate a status update for the given unit, with the status being completion of manufacturing, readiness for pick-up, being in transit to a retail store or a storage facility, completion of delivery to the retail store or the storage facility, being offered for sale, being under discount, having been purchased by a customer, being in transit to an address designated by the customer, being packaged for return, being in transit as a returned unit, or completion of return delivery to the retail store or the storage facility.

6. The system of claim 1, with the code database assigning party, responsibility, payment, and penalty parameters assigned to the given product to each unit associated with the given product, with the party, responsibility, payment, and penalty parameters indicating:
   a. which parties are paid after an occurrence of a first given status update and how much the indicated parties are paid, and which parties are penalized after a second given status update and how much the indicated parties are penalized.

7. The system of claim 6, with the code database identifying an order in which each of the indicated parties are paid.

8. The system of claim 1, with updates to the code database being encoded on a blockchain.

9. The system of claim 1, with each given unit being assigned a given cryptocurrency coin, with updates pertaining to the given unit being encoded onto a blockchain on which the given cryptocurrency coin operates.

10. A system comprising a code database, a set of actuation devices, and a central controller;
    a. with the central controller comprising a set of processors programmed to receive updates on products and units and save the updates to the code database;
    b. wherein in the code database:
       i. each product is assigned a product code and associated with a plurality of units;
       ii. each unit of the plurality of units associated with a given product is assigned a unique unit code, and has a unique price and a physical location identifier;
    c. with each unit having the unique unit code attached physically to the each unit;
    d. with each actuation device configured to perform a unit code scan;
    e. with each actuation device configured to associate any given unit code scan of a given unit with:
       i. a time at which the given unit scan occurred,
       ii. physical location parameters, with the physical location parameters identifying a physical location in which the scan occurred or at which the given unit is located at approximately the time at which the given unit scan occurred;

iii. with the physical location parameters including a physical address parameter and an internal location parameter;

iv. with the actuation device configured to determine the physical address parameter using GPS and the internal location parameter by detecting the distance and/or proximity of electromagnetic signatures of electromagnetic chips positioned adjacent to the given unit;

f. with the set of processors programmed to:

i. upon detecting a scan of a given unit code for a given unit by a given actuation device, update in the code database the physical location identifier of the given unit code database based on the physical location parameters.

11. The system of claim 10, with the electromagnetic chips attached to transportation vehicles onto which the given unit is loaded or with which the given unit is carried.

12. The system of claim 10, with the actuation devices configured to communicate a status update for the given unit, with the status being completion of manufacturing, readiness for pick-up, being in transit to a retail store or a storage facility, completion of delivery to the retail store or the storage facility, being offered for sale, being under discount, having been purchased by a customer, being in transit to an address designated by the customer, being packaged for return, being in transit as a returned unit, or completion of return delivery to the retail store or the storage facility.

13. The system of claim 10, with the code database assigning party, responsibility, payment, and penalty parameters assigned to the given product to each unit associated with the given product, with the party, responsibility, payment, and penalty parameters indicating:

a. which parties are paid after an occurrence of a first given status update and how much the indicated parties are paid, and which parties are penalized after a second given status update and how much the indicated parties are penalized.

14. The system of claim 13, with the code database identifying an order in which each of the indicated parties are paid.

\* \* \* \* \*